(12) United States Patent
Pietsch

(10) Patent No.: US 7,032,744 B1
(45) Date of Patent: Apr. 25, 2006

(54) CONTINUOUS HAULAGE SYSTEM

(76) Inventor: Michael Pietsch, 27 Stiles Avenue, Burswood, WA (AU) 6100

( * ) Notice: Subject to any disclaimer, the term of this patent is extended or adjusted under 35 U.S.C. 154(b) by 134 days.

(21) Appl. No.: 10/130,020

(22) PCT Filed: Nov. 6, 2000

(86) PCT No.: PCT/AU00/01358

§ 371 (c)(1),
(2), (4) Date: May 10, 2002

(87) PCT Pub. No.: WO01/36303

PCT Pub. Date: May 25, 2001

(30) Foreign Application Priority Data

Nov. 12, 1999 (AU) .................... PQ4012

(51) Int. Cl.
*B65G 15/08* (2006.01)
(52) U.S. Cl. ..................... 198/819; 198/823
(58) Field of Classification Search .............. 198/819, 198/823, 833, 861.2
See application file for complete search history.

(56) References Cited

U.S. PATENT DOCUMENTS

| 843,018 | A | * | 2/1907 | Jamieson ............... 198/823 |
| 3,381,799 | A | * | 5/1968 | Havelka ............... 198/823 |
| 3,392,817 | A | * | 7/1968 | Grimm ............... 198/819 |
| 3,661,244 | A | * | 5/1972 | Koyama ............... 198/819 |
| 4,499,993 | A | | 2/1985 | Paurat et al. ............... 198/819 |
| 4,852,724 | A | * | 8/1989 | Bodimer ............... 198/861.2 |
| 4,915,213 | A | | 4/1990 | Loodberg et al. ............... 198/819 |
| 5,860,510 | A | | 1/1999 | Becker | |

FOREIGN PATENT DOCUMENTS

| EP | 0 084 511 | | 7/1983 | |
| FR | 2 390 351 | | 12/1978 | |
| GB | 2145683 | * | 4/1985 | ............... 198/819 |
| RU | 2 118 284 | | 8/1998 | |
| WO | WO 89/12593 | | 12/1989 | |

* cited by examiner

*Primary Examiner*—Joseph Valenza
(74) *Attorney, Agent, or Firm*—Baker & Daniels

(57) ABSTRACT

A continuous haulage system, including a belt adapted to convey material, said belt being suspended from supporting means by hanging members located along each opposing longitudinal edge of said belt, wherein the hanging member has a hook-shaped cross-section.

38 Claims, 8 Drawing Sheets

CONTINUOUS HAULAGE SYSTEM

The present invention is generally directed to the removal of material from a mine site, specifically continuous haulage systems, and in particular to suspended continuous haulage systems.

Run of Mine (ROM) material is defined as any free material from a mine, including both ore and waste material. In the economic analysis of the viability of a mine, a vital consideration lies in the assessment of the cost of transporting (ROM) material following extraction.

Typically, the material is removed by purpose built trucks, capable of transporting many tens of tonnes of material at a time. The ROM material is loaded onto the trucks, either from temporary stockpiles or directly from extraction. The trucks then travel from the pit to the waste material dump or to the ore crushing plant, depending on the quality of material for the particular load.

The purchase of a fleet of appropriate trucks involves a considerable capital cost, as does the establishment and maintenance of roads of sufficient bearing capacity to bear the load of heavily laden trucks. Further, as the mining process progresses, the extraction point moves deeper, the path to be followed by the trucks lengthens. For a typical road grade of 10%, this means for every meter of depth, an extra 10 meters of road is required. Consequently, the cycle time for the trucks to retrieve material, dump it and return, increases. It follows, therefore, that there will be an ever increasing unit cost of ROM material over time, as the mine progresses. This variable cost, combined with the substantial amortized capital cost, have an enormous detrimental effect on the viability of mining operations.

As an alternative method, it is known to adopt conveyor systems to remove this material. Conventional conveyor systems are characterized by reinforced rubber belts, supported beneath the belt by idlers and some form of drive system to motivate the belt. The system is in a fixed position, and must be substantially straight, having little or no ability to deviate either horizontally or vertically.

A conveyor system needs to be tensioned between drive drums, which provide the motivating drive, thus being a substantial contributor to the lack of deviation. Therefore, it is normal, for such systems, to spend a considerable amount of time selecting the path to ensure an uninterrupted straight path is achievable.

A further problem lies with the mine environment. As would be expected, there is a considerable volume of dust, mud and water, which infiltrate and generally envelope all equipment within the mine zone. The combination of these factors provide for a natural and effective lubricant. Once in contact with the belt, the drive capability of the drive drums is markedly reduced. Whilst this can be accommodated for in a horizontal orientation, when the belt is inclined, the traction force is reduced below a useful level, and drive can be substantially lost.

It also follows that, when inclined above a certain angle, the material will slide down the belt, preventing transport. Typically, such systems are restricted to about 20° from the horizontal.

A further problem is the size limitation of the system. The belt of the conveyor system is susceptible to severe damage from large, angular rocks, partly because of the punching shear force established between the sharpness of the rocks on the belt and the support from underneath, as a result of the impact of the rocks. As a consequence, such systems are associated with In-Pit Crushing plants, to reduce the size and weight of individual rocks to be transported. Typically such systems are limited to rock sizes of less than 300 mm, and thus any material to be removed from the pit must be crushed to a suitable size.

A significant problem associated with this arrangement is the cost of crushing. The establishment and operation of a crushing plant is significant, and is an operation which is, justifiably, only performed if absolutely necessary. Unfortunately, it has been shown in practice that, typically, ROM material comprises a very high percentage of material above 300 mm, up to a common maximum of 1000 mm, not withstanding extremely large "renegade" rocks of unpredictable size. Thus, this initial crushing is necessary, but based on the limitations of the conveying system rather than on a sound economic basis.

Further, because material must first be delivered to the crushing plant, normally be truck, then loaded to some type of conveyor system, the material is having to be "double handled". With every transfer of material between transport mediums representing additional cost per tonne processed, further detracting from the economic viability of such a system.

Further still, whilst the ratio of waste material to ore can vary substantially, economic forecasts for a mine's viability often rely on a ratio of 6:1, that is for every 1 tonne of ore there is 6 tonnes of waste. Using the truck based system, this waste material is taken directly to a dumping site, as crushing of such material is of no practical benefit, and represents an enormous and pointless waste of resources. However, for a conveyor system, crushing of waste material above 300 mm is essential, so that it can be transported out of the pit.

An alternative form of conveyor system is the so-called suspended belt system, as exemplified by U.S. Pat. No. 4,915,213. This system, marketed under the name SICON, includes a belt that is tear-drop shaped, and open at the top. The longitudinal edges of the belt, adjacent to each other at the top of the tear-drop shape, are mounted on continuous cables tensioned between end drums that drive the belt through friction. Material is loaded by separating the cables, allowing the belt to open. After loading, the cables are brought together, containing the material not unlike a sack. It has been found that such an arrangement cannot be used on a significant slope without slippage of material thereon.

Further, these systems are confined to small particle sizes, typical maximum sizes being 40 mm to 70 mm. Further, such system have the same reliance on drive drums as do conventional conveyor system, and so lack mobility. Hence, such systems are generally confined to different applications relating to bulk handling of fine materials. And for this reason, the use of such systems is virtually unknown in the mining industry, providing no practical solution to the problem of transporting substantial volumes of large sized material.

It is therefore an object of the invention to provide a continuous haulage system that can provide an advantage over the prior art in terms of efficiency or effectiveness.

With this in mind, according to one aspect of the present invention, there is provided a continuous haulage system, including a belt adapted to convey material, said belt being suspended from a plurality of discrete supporting means by hanging members located continuously along each opposing longitudinal edge of said belt, wherein the hanging member has a hook-shaped cross-section. The belt may be both flexible in the longitudinal and lateral direction, such that it can at least substantially form a supporting tube for conveying material therein when the supporting idlers converge towards each other for the haulage of material. Loading and unloading is also effected by diverging from each other, and thus opening the belt.

The hook-shaped profile may be provided along a reinforced portion at each longitudinal edge of the belt. The hook-shaped profile serves the dual function of being retainable on the idlers during service and making the belt readily detachable for maintenance.

The key advantage to the hook-shaped profile, however, is the capacity for a translational degree of freedom. As the hook-shaped profile and idler profile are dissimilar curves, the action is more than merely a "ball in socket" motion, which is typical of similar curve profiles (often spherical). By adopting dissimilar curves, the area of contact between the idler face and the hook-shaped profile can vary substantially along the curvi-linear path of the hook-shaped profile. Thus, this action permits a very wide scope to accommodate vertical and horizontal curves along the line of haulage.

It is noted that the belt may be continuous, with the hook-shaped profile extending along its entire length. Alternatively, the belt may be a segmented belt, that is, a belt formed as a plurality of discrete portions joined in series, but still retaining the hook-shaped profile along the longitudinal edge of the portions. In this manner, the "train" of segmented sections functions in the same manner as a continuous belt. Such an alternative further provides the advantage that sections may be added or removed for lengthening the belt or replacing damaged sections. It also provides the advantage that sections may be replaced by linking elements, such as a chain or rod, where the volume of material to be transported is small, but individual rocks are of such a size as to require a large capacity belt.

Further, the extra degree of freedom permits increased rock sizes as compared with the conventional conveyor belt systems and suspended belt systems. Whereas such systems are restricted in the size of rock that can be transported, the ability of the hook-shaped profile to rotate and translate permit rocks of greater than 300 mm in diameter to be accommodated within the belt under normal conditions.

Further still, the extra degree of freedom also provides for the belt to open further to permit the capacity of the belt to be utilized to a greater degree than conventional systems. Thus, whereas conventional systems tend to impart adverse loads to other elements in the system, the present invention avoids such problems.

It should be noted that this extra capacity also has a synergistic effect with regard to vertical mobility. As stated previously, the system provides for travel up inclined surfaces. To travel up such a slope requires the run of mine material to be stable within the belt. By increasing the volume of material held, there is a tendency for the material to consolidate, thus providing a mass of material that tends to act in a unitary fashion. Known as "bridging", when material is loaded into the belt, and the opening closed, the material is compressed by the closing walls of the belt. This compression tends to consolidate the material, preventing the material from flowing easily. When loaded to a significant proportion of the belt's capacity, the material actually binds up such that no flow is possible.

This effect is known as a problem in situations where material is required to flow, such as loading hoppers, feed bins, ore passes and so forth. The present invention, however, uses the consolidation to advantage by controlling the effect. Subsequently, when unloading the belt, the opening is widened and the belt loosens the material, permitting the material to flow once again.

Further still, the hook-shaped profile has the advantage of being self cleaning. With the concave aspect of the profile being directed downwards, any detritus that is adhering to the idlers and is transferred to the belt, will tend to dislodge quickly, falling away harmlessly, rather than merely infiltrating the equipment completely. This self cleaning action is further assisted by the any particular portion of the belt only being in intermittent contact with the idler support.

In a further embodiment, the hook-shaped profile would also include a reverse curve, whereby a second idler may provide a downward reaction to the concave face of the reverse curve extremity of the longitudinal edge of the belt.

In a still further embodiment, each longitudinal edge of the continuous belt may have a second hook, as a mirror image of the first, and thus at the same level but directed away from the first hook, but having the concave portion of the hook also directed downward, as does the first. This embodiment permits the use of variable arrangement of idlers for extra stability, drive, loading or unloading characteristic or other associated purpose.

In a still further embodiment, a second hook may be placed in the same alignment as the first, but directly below the first, and thus accommodate a bank of idlers one above the other.

According to another aspect of the present invention, there is provided a continuous haulage system including a belt adapted to convey material, said belt being suspended from a plurality of discrete supporting means by hanging members located continuously along each opposing longitudinal edge of said belt, wherein the hanging member has a hook-shaped cross-section, and further including at least one drive means adapted to impart a driving force to said belt by engaging a receiving means located along each opposing longitudinal edge of the belt. The drive means may include a caterpillar drive, having a continuous elongate drive surface, contacting a portion of the belt or a carrier of the belt, to impart a driving force by friction or by mating surfaces between the caterpillar drive and the belt, or belt carrier. As an alternative, the caterpillar drive may include a series of sprockets. Further, the continuous belt may be a chain having the elongate drive surface bonded to it. Thus, the continuous belt may be a chain drive rather than driven through friction. Said drive system may include a plurality of caterpillar drives placed intermediate between the extreme ends of the continuous haulage system. As part of the support system for the belt, the drive system may be associated with idler units mounted into frames, said idlers not having drive capability, that act to support the driven belt and are also placed intermediately between the extreme ends of the continuous haulage system.

To facilitate the normal return of the belt, at each end may be located an undriven pulley unit, mounted into a frame, that acts to support and "return" the belt.

The drive means and idler units may be part of a continuous frame work. Alternatively, the drive and idler units may each be mounted within discrete frames. In the case of discrete frames, these may be linked to permit a pivotal movement between each frame. Alternatively, the discrete frames may be isolated from each other, there being no direct contact between adjacent frames.

By placing one or more intermediate caterpillar drives, the belt may be driven, without the need of high tensioning between drums as in conventional end drum drive systems. Thus, a belt driven by the caterpillar drive does not require tensioning.

Therefore, use of the drive system, and subsequent lack of tensioning, provide for the extension of the continuous haulage system. The fixity of the end drive drums was a major determinant in the inextensibility of the conventional conveyor system, in that, the point of extraction is continually moving but the drive drums are unable to be moved with ease. The invention permits the addition of further discrete idler unit frames to the continuous haulage system, as well as further drive units if required for extra drive. Also, being undriven the pulley units at the ends are readily moveable. Thus, by lengthening the belt, and adding new units, the continuous haulage system is able to be extended by adopting the drive system.

In another embodiment of the present invention, there is provided a belt for a continuous haulage system, said belt having a hook-shaped profile continuously along its longitudinal edge, wherein the belt may be corrugated, said corrugation propagating longitudinally along the length of the belt.

As distinct from a mere surface profile, the corrugated belt provides for two distinct advantages over the prior art. Firstly, with regard to the continuous haulage system located on an inclined surface, the corrugations further assist in retaining material by providing a series of barriers at discrete distances along the belt length. Thus when the belt is being used under capacity, and the binding effect of a large volume of material is less effective, the addition of the corrugations provides interference for the backward slide of the material, and thus the material may be retained.

Secondly, as stated previous, the flexibility of the belt yields specific advantages over the prior art with respect to providing vertical and horizontal curvature of the haulage path. Hence, by providing a corrugated belt, each corrugation acts as an articulating element, further enhancing the flexibility of the belt in both the vertical and horizontal direction.

Large rocks cause substantial damage to rubber-based belts, both through normal wear and through localized damage as a result of sharp irregular protrusions. A corrugated belt carrying large rocks will tend to bind such rock between the protrusions and the inner corrugations. Thus to limit or prevent damage to the belt from large rocks, such inner corrugations can be reinforced against such damage, and this extend the life of the belt beyond that of a conventional flat belt.

In a further embodiment, the corrugations may be inclined at an angle to the vertical axis of the belt. This provides for an effectively vertical corrugation when the belt is inclined up a slope. In such a circumstance, each individual corrugation will provide an interference extending along a significant length of the belt. As a portion of the belt containing material climbs an inclined surface, the material will shift downward. This shift of material will be limited by the corrugations. In the case of each corrugation influencing material over a greater length of the belt, the ability of the material to "bridge" will be enhanced, as the bridging effect will involve more material per corrugation, and thus provide an increased ability to restrain the flow of material as the belt becomes inclined.

In a further embodiment, the corrugations may extend along a portion only of the cross-section periphery, being symmetrical about the centreline of the cross-section and encompassing the curved base of the cross-section.

In a still further embodiment, the depth of each corrugation may vary along the length of the corrugation, with the greatest depth occurring at the base of the belt, and symmetrically reducing in size on either side of the base.

According to yet another aspect of the present invention, there is provided a continuous haulage system, including a belt, said belt having a hook-shaped profile along its longitudinal edge, said continuous haulage system being driven by a drive system, wherein the drive system includes at least one drive means located along a the length of the belt, contacting a portion of the belt or a carrier of the belt, to impart a driving force by mating surfaces between the drive means and the belt, or belt carrier. The drive means may include a caterpillar drive naving a continuous drive surface.

Whilst the drive system provides for an extension of the continuous haulage system, in the event such an extension also requires a deviation around an obstacle, the articulation of the idler units frames and the hook to idler connection provide sufficient flexibility for the belt and the supporting frame to vary from a straight line around the obstacle.

This flexibility also permits vertical curvature, such that the haulage system can negotiate vertical inclines. As discussed, conventional suspended systems are unable to travel up vertical inclines of more than about 30°, as the material will tend to slide backwards. This is due to the relatively small volume of material within the belt, which can readily slide longitudinally down the belt. In the present invention, however, because the loaded belt is close to full capacity, the ability for the material to shift more than a marginal amount is restricted. Thus, apart from minor settling, the material is unable to move, allowing the continuous haulage system to travel up inclined slopes far exceeding those of conventional systems.

According to yet another aspect of the present invention, there is provided a continuous haulage system including a belt adapted to convey material, said belt being suspended from a plurality of discrete supporting means by hanging members located along each opposing longitudinal edge of said belt, wherein the hanging member has a hook-shaped cross-section, and further including an articulated support system including a plurality of support frames each being pivotal in the horizontal plane and also in the vertical plane.

A feature of having each frame pivotally adjustable, when used as a series of similarly adjustable frames in combination with a continuous haulage system, is to provide for a fully articulated system that is adjustable to accommodate obstacles and traverse inclined surfaces.

A second feature of the above described system, is the extensibility of the system through the addition of further individual units.

More importantly, in combination, these features provide a two part procedure for the tracking of the moving extraction point within a mine. An example is a mobile excavator on a track traversing an excavation face within a mine. As the excavator is constantly moving whilst removing material from the face, any system for removing the run of mine material must likewise move.

In this case, before commencing the excavation process, the continuous haulage system may be established. Rather than having the haulage line, of initially fixed length, being in a straight line, the line may have several meanders before presenting the loading point of the continuous haulage system in proximity to the commencement point of the excavation. Thus the effective distance of the haulage line would be substantially less than the actual length.

As the excavator proceeds, in order for the loading point to remain in a proximate position with the excavator, the loading point may be readily moved to follow the excavator. By advancing the loading point, the articulation in at least one of the frames accommodates the movement, and thus the continuous haulage system self aligns as the meanders are straightened. Thus, the effective length may be extended, without affecting the overall length of the haulage line. This process of advancing the loading point can be repeated until the effective length and actual length are the same. Thus, the calculation of the actual length may be influenced by the length of the excavation face, or similar.

At times of establishing the system, or where coarse adjustment of the length of the system is required, additional articulated frames can be added, and a corresponding length of belt added. Whilst not as readily achieved as the articulation of the individual frames, when required, the actual length of the haulage line can be increased by lengthening the belt and adding additional frames.

BRIEF DESCRIPTION OF DRAWINGS

It will be convenient to further describe the present invention with respect to the accompanying drawings which illustrate possible arrangements of the invention. Other arrangements of the invention are possible, and consequently the particularity of the accompanying drawings is not to be understood as superseding the generality of the preceding description of the invention.

DESCRIPTION OF PREFERRED EMBODIMENT

Figure 1:
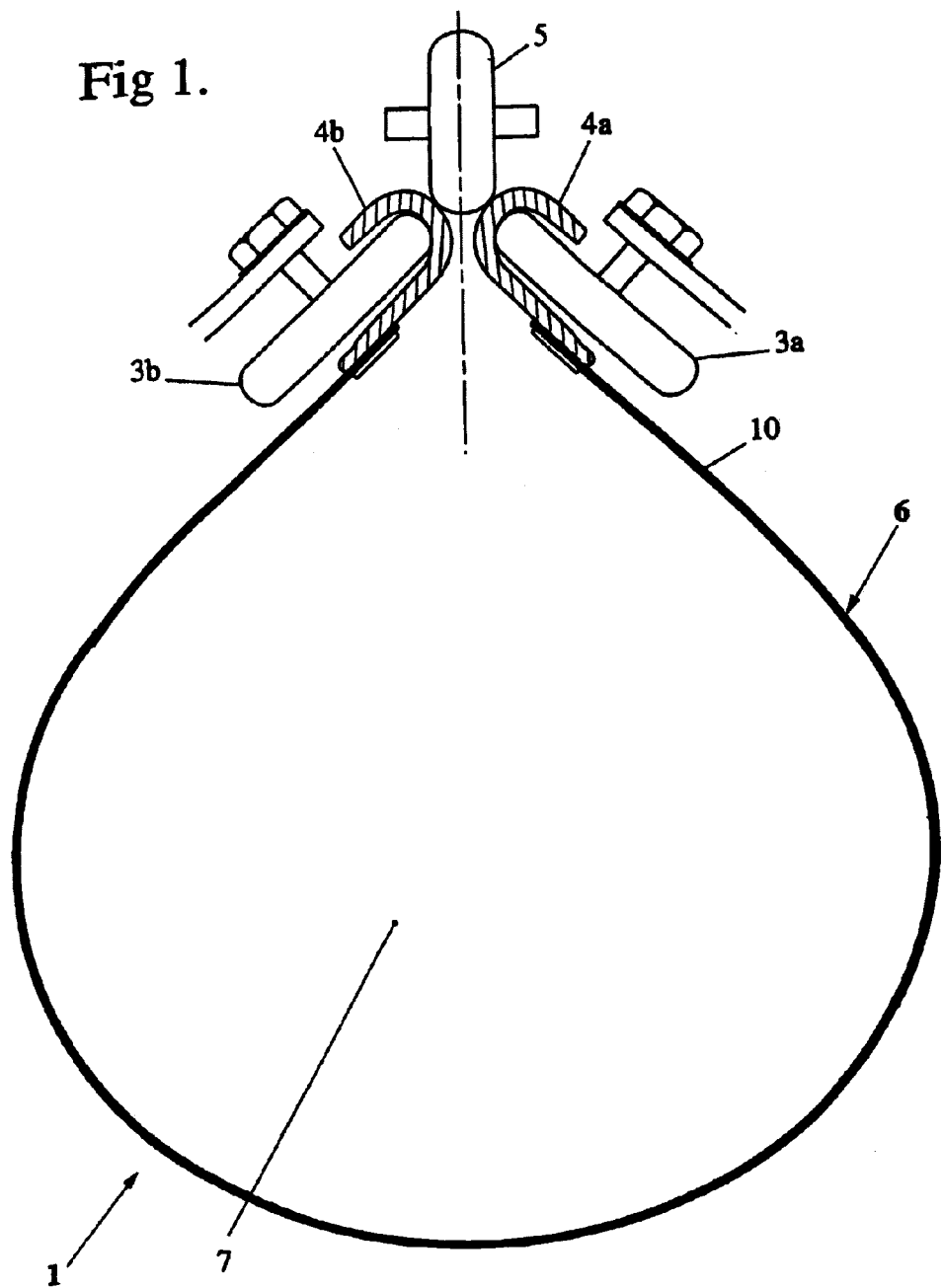
FIG. 1 is a cross sectional elevation view through the belt of a first possible arrangement of the continuous haulage system according to the present invention.

FIG. 1 shows a belt 1 in the closed state for a suspended continuous haulage system, wherein the belt 1 is supported intermittently by a series of idler sets 2, made up from two opposing and inclined idlers 3a and 3b contacting the belt at two hook shaped profiles 4a and 4b longitudinally and continuously extending for the full length of the belt 1. A central idler 5 bears downwards on the hooks 4a and 4b, providing a reaction for the generally upward directed idlers 3a and 3b, and thus clamping the hooks 3a and 3b in a three way grip between all the idlers 3 and 5.

The hooks 3a and 3b are located along each of the longitudinal edges of a strip 6 made from a reinforced rubber compound, designed to resist abrasion and local shear. The hooks 3a and 3b comprise shaped metal elements to form the hook shape, and reinforced by a plurality of steel cables, or other composite construction, running longitudinally and parallel with the strip 6. The hooks 3a and 3b are integrally connected 10 to the strip 6 to form the belt 1.

The continuous haulage system functions by transporting material within the enclosed space 7 of the belt 1. The belt is driven in a continuous loop, and supported intermittently by a series of idler sets 2, which act to both support and to keep closed, the confining the material within the space 7 and also applying a lateral distributed load through the rubber strip 6 to the material within. Thus, the material tends to compact partially, assisting in the transport of the material.

Figure 2:
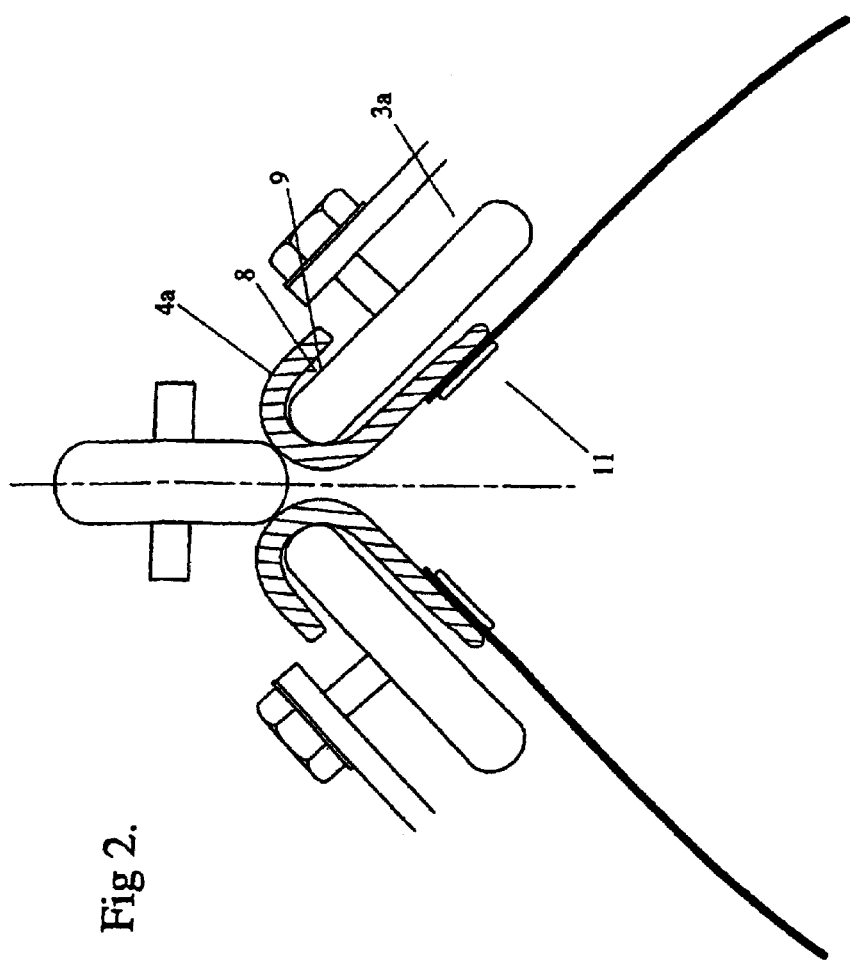
FIG. 2 is a detail view of the hook and idler of the system of FIG. 1.

FIG. 2 shows the hook 4a to idler 3a arrangement in detail. The hook 4a has the concave portion of the hook 4a directed generally downwards, allowing the generally upwardly directed idler 4a to engage the hook 4a. When the belt 1 is in the loaded condition, the angle at which the hook 4a is generally directed will vary away from substantially vertical to a position where the concave portion of the hook 4a may be directed downward and outward at an angle of up to 45° to the vertical. The idler 3a, as part of the three way support is directed upwards and out of the vertical by up to 45°. Thus, in combination with the other idlers 3b and 5, the hooks 4a and 4b are pressed together, holding the belt 1 in the closed position.

To effectively hold the belt 1 in the closed position, the idlers 3a, 3b and 5 must prevent any translation freedom of the hooks 4a and 4b. However, the special arrangement of the hooks and idlers (3a, 3b, 4a, 4b and 5) permit a single rotational freedom, such that the hook may be rotated within the plane of the belt 1 cross section.

This rotational degree of freedom is achieved by the dissimilar curves of the hook 4a and idler 3a. The curve 8 of the concave surface of the hook 4a is of significantly different radius than the curve 9 of the idler 3a. A compatible curve arrangement between the hook 4a and the idler 3a would emulate a ball and socket arrangement, and thus the two curves 8 and 9 would have a surface contact. Whilst this would permit the hook 4a to rotate freely, if not connected to the strip 6, the strip 6 lacks clearance from the idler set 2 to allow the belt 1 to gain its full capacity. By having the curves 8 and 9 dissimilar, the relative motion of the hook 4a and idler 3a requires the contact between the surfaces 8 and 9 to move freely, and thus both rotation and a type of translation occurs. Thus, when the space 7 is being loaded with material, as the belt 1 expands, the hook 4a rotates and translates to a balanced position, allowing the extra capacity to be realized. The increased rotation and translation is demonstrated by the angle 11 from the vertical.

Figure 3:
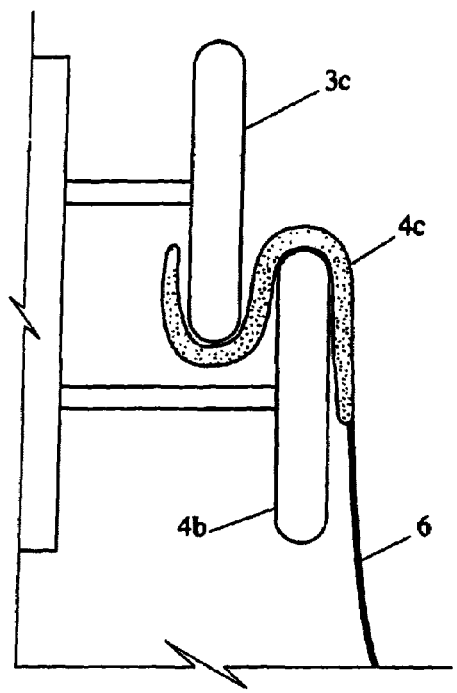
FIG. 3 is a cross-sectional detail view of the hook and idler of a second possible arrangement of the continuous haulage system according to the present invention.

FIG. 3 shows an alternative embodiment of the hook arrangement, wherein the first hook portion has an extension in the form of a reverse curve 4c. Where the first hook portion has the concave surface directed generally downwards, it follows the reverse curve 4c portion has the concave surface directed upwards. The upwardly directed surface is adapted to make contact with a further idler 3c placed adjacent, and generally parallel to, the first 3b. Whereas the first idler 3b provides the upward reaction to support the belt 6 through the first hook portion, the second idler 3c provides a downward reaction. An advantage provided by the reverse curve 4c includes stability during loading and unloading. A feature of the present invention is the ability of the hook and idler to rotate and translate relative to each other so as to fully utilize the belt capacity to held material. However, there may be instances where this movement is not required, such as at loading and unloading. By providing a second point of reaction parallel with the first, a broad support is provided at the hook portion, limiting or preventing rotation, and thus provide the required stability.

Figure 4:
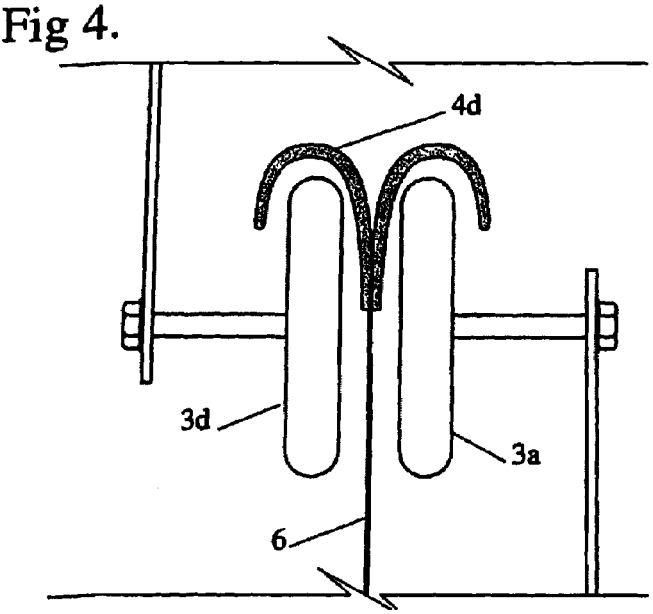
FIG. 4 is a cross-sectional detail view of the hook and idler of a third possible arrangement of the continuous haulage system according to the present invention.

FIG. 4 shows a further alternative embodiment of the hook arrangement, wherein the single hook portion is replaced by a dual hook portion 4d, that is, two hook portions, the second being a mirror image of the first. In addition to providing a stability function similar to the reverse curve 4c embodiment, the dual hook 4d has the further advantage of increasing the load carrying capacity of the belt 6 at that portion. Again, this embodiment has an advantage during the loading phase. As a result of the impact of material entering the belt 6, the loads to be resisted by the support system are higher than at any time during the transport of the material. By providing a second downwardly directed hook 4d, and thus a further upward reaction idler 3d, the loading carrying capacity is doubled at a time when such extra capacity is required.

Figure 5:
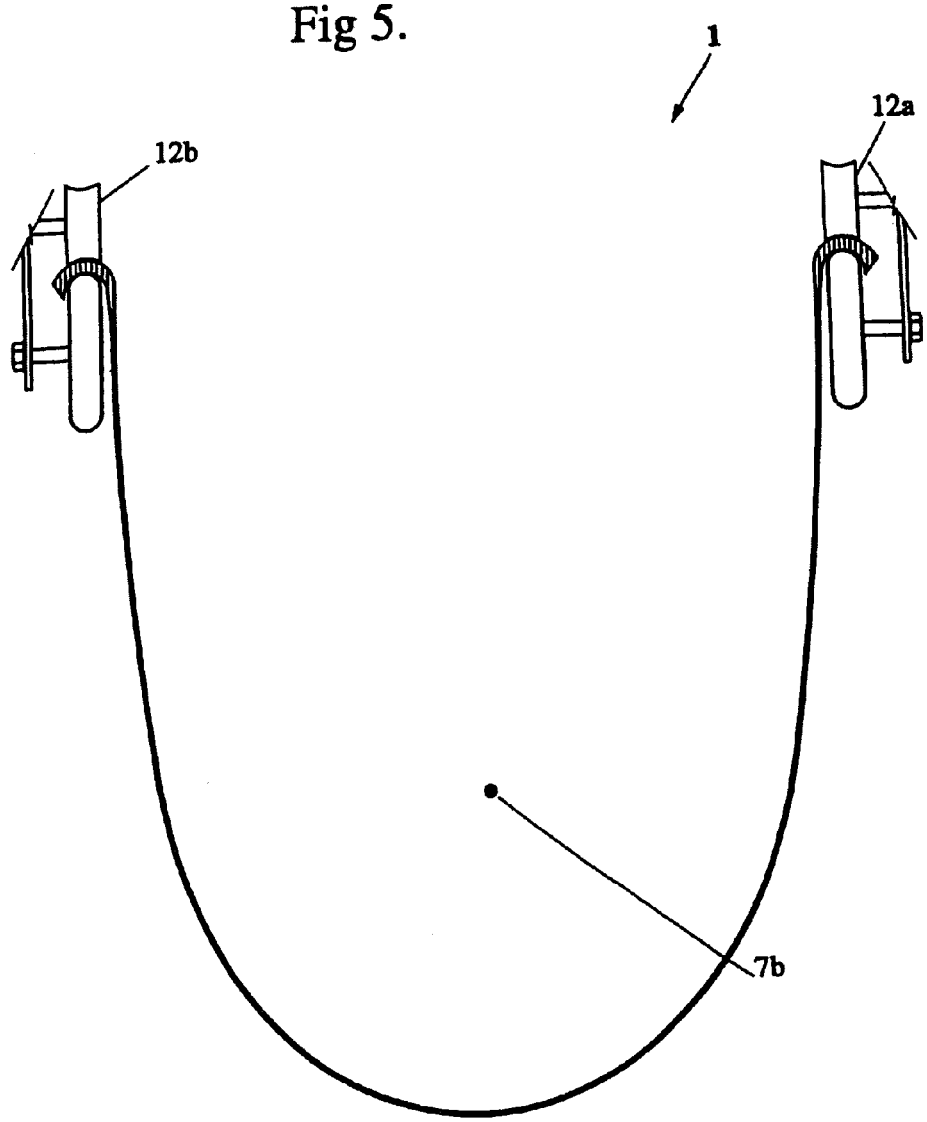
FIG. 5 is a further cross sectional view through the belt showing the loading position of the system of FIG. 1.

FIG. 5 shows the belt 1 in the open position ready for loading and unloading of the material. To open the belt 1, a differing idler set 12a and 12b is required. Previously, where the idler set 2 provided a three way clamping action, in this instance, the open position requires the opposing idlers 12a and 12b to diverge, which separate the longitudinal edges of the belt 1, and thus opens the belt 1. In this position, material may be loaded directly into the space 7b through a hopper (not shown) or other means.

Figure 6:
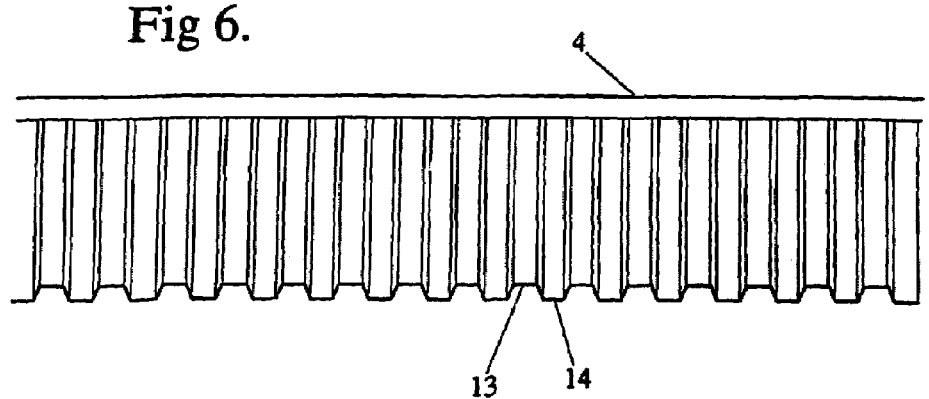
FIG. 6 is a side elevation of the corrugated belt of a fourth possible arrangement of the continuous haulage system according to the present invention.

FIG. 6 shows an alternative possible arrangement of the belt 1 in elevation, providing a longitudinal orientation to the continuous haulage system. In this embodiment of the invention, the belt 1 displays corrugations 13 and 14 placed longitudinally along the belt 1 in spaced relation to each other. The corrugations 13 and 14, in this case, are vertically disposed, however, variants where the corrugations 13 and 14 are inclined may also be contemplated. The corrugations 13 and 14 are formed by providing increased reinforcement in the raised portion 13 of the belt, such that sharp rocks being loaded or transported by the belt 1 contact the raised corrugations 13, having vastly increased abrasion resistance as compared with the troughs 14 of the corrugation. Thus, this provides for the raised portion 13 to have replaceable inserts (not shown) providing the reinforcement. In this case; the belt 1 remains protected from rock damage by a continual replacement of the protective inserts.

Figure 7:
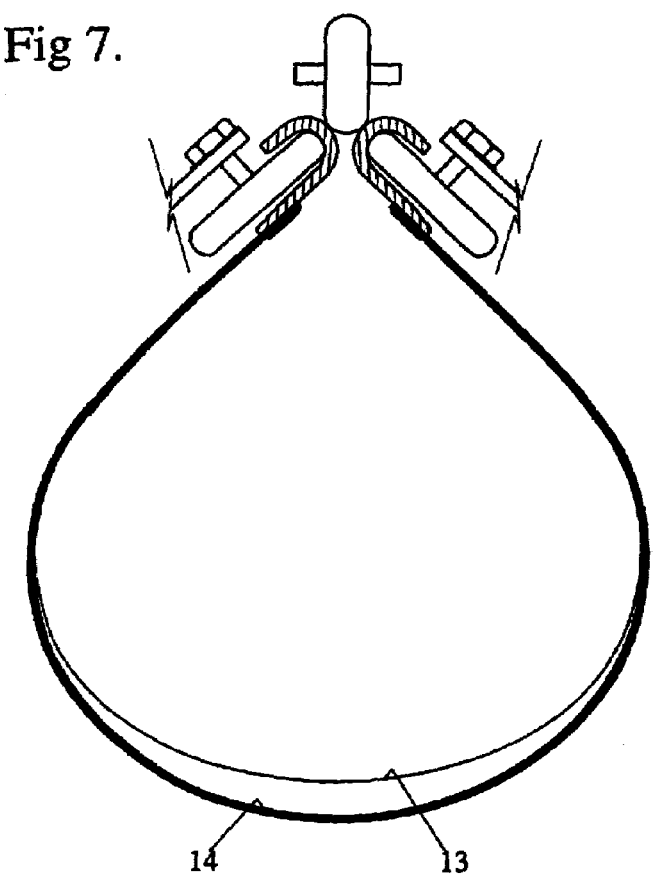
FIG. 7 is a cross sectional view through the corrugated belt of the system of FIG. 6.

FIG. 7 shows the corrugations 13 and 14 in cross section, and provides insight into the corrugations second most valuable feature. As has been discussed, the belt 1, when closed tends to compact the material. This compaction tends to bind the material through an enhanced cohesion, and thus limiting movement of the material during transportation. With the provision of corrugations 13 and 14, the compaction is selectively applied to the material, as well as enhanced in these locations, and thereby enhancing the compaction effect.

Figure 8:
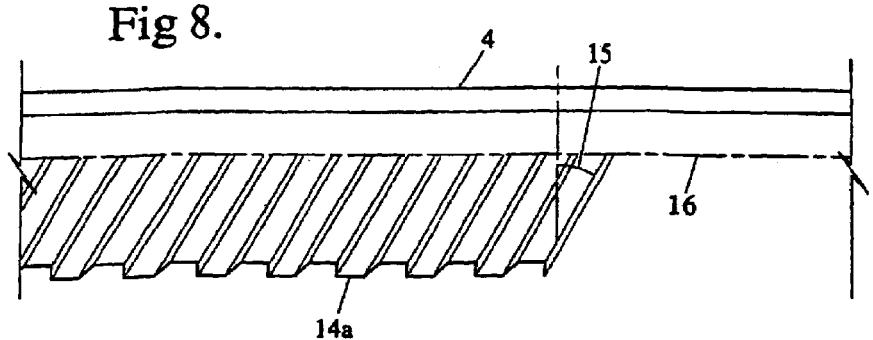
FIG. 8 is a side elevation of the corrugated belt of a fifth possible arrangement of the continuous haulage system according to the present invention.

FIG. 8 shows an alternative arrangement of the belt 1. Whereas the belt of FIGS. 6 and 7 showed a belt 1 having corrugations 14 directed at right angles to the axis of the belt 1, the corrugations 14a of FIG. 8 are inclined at an angle 15 to the vertical. The inclination of such corrugations 14a are useful when the continuous haulage system is positioned up an inclined surface. With the "bridging" effect, the conveyed material is held in a semi-consolidated mass. When travelling up an inclined slope, gravity will tend to push the material back down the belt. Whilst this action can assist consolidation, any weakness in the mass can also disturb the consolidation. By using inclined corrugations 14a, further assistance against this back sliding is provided, thus enhancing the characteristics of the system.

FIG. 8 further shows the corrugations only extending partially up the belt 1 to a line 16. Applicable to both inclined 14a and non-inclined 14 corrugations, the degree to which the corrugations 14a extend upward provides only an incremental benefit passed a certain line 16. This line 16 will vary with conditions, materials, moisture content, inclination etc. Hence, when designing a system, the line 16 can be used to optimise the system if a full height of corrugation 14a is not required.

Figure 9:
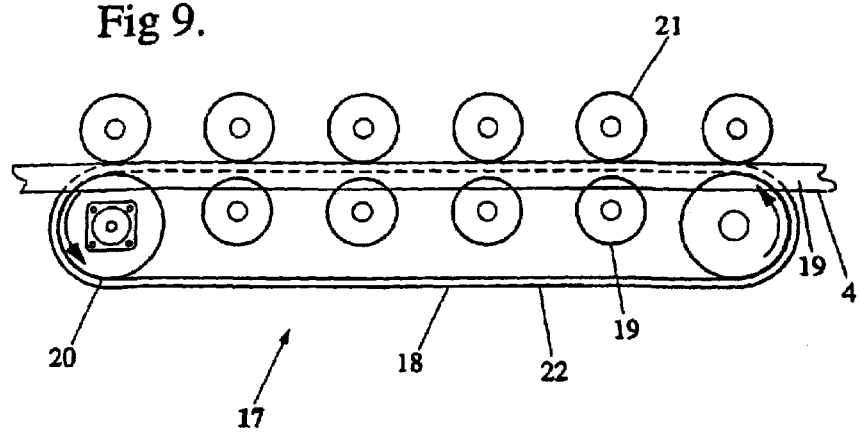
FIG. 9 is a side elevation of the caterpillar drive of the continuous haulage system according to the present invention.

FIG. 9 shows the belt 1 being driven by the caterpillar drive 17, which includes a continuous belt 18 actuated by a drive roller 20 with the continuous belt 18 traveling around a series of caterpillar idlers 19. The hook 4 of the belt 1 is driven by being threaded between the continuous belt 18 and a series of pinch idlers 21. Thus, the drive along the continuous belt 18 is assisted by the adjustable pressure applied between the pinch idlers 21 and the caterpillar idlers 19, through the continuous belt 18. Hence, whilst the drive 17 may be based on friction, the reaction pressure which controls the friction drive is adjustable under adverse conditions.

As an alternative, the caterpillar drive 17 may include a series of sprockets in place of the drive roller 19 and caterpillar idlers 19. Further, the continuous belt 18 may be a chain having a drive surface bonded to it. Thus, the continuous belt 18 may be a chain drive rather than friction.

To further assist the drive capacity of the system, the continuous belt 18 may be profiled or knurled 22 and a complimentary knurling 23 on the concave surface of the hook 4. Thus, the continuous haulage system[1] may be configured such that the drive system 17 is independent of environmental conditions which may limit the effectiveness of friction based drives, by providing a drive system similar in concept to a sprocket and chain arrangement. The profiling, or knurling 22, can be effected by the provision of teeth, projections or other raised portions, so as to provide a better grip. When such profiling 22 is present on both the continuous belt 18 and the concave surface of the hook 4, a meshing or engagement between the two elements 18 & 24 can be achieved. This meshing can ensure the driving force imparted to the hook 4 is through a positive drive rather than relying on friction.

Figure 10:
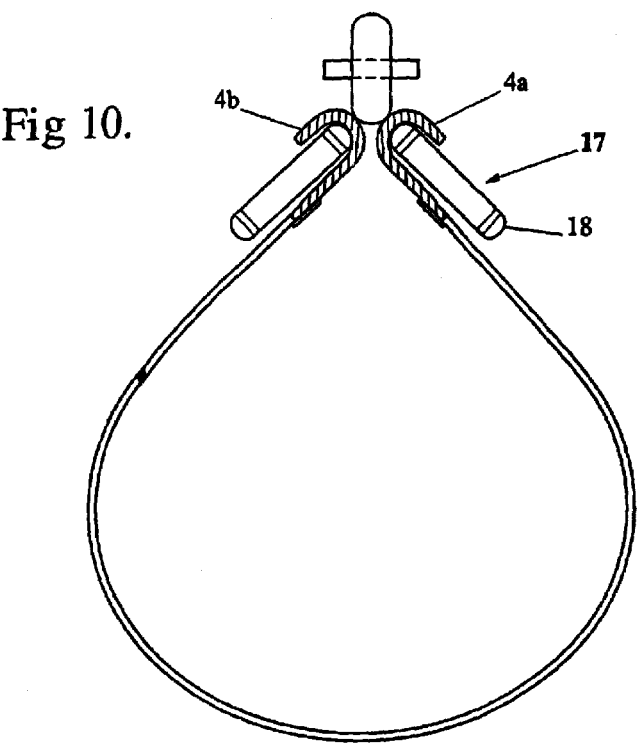
FIG. 10 is a further cross sectional view through the belt, showing the hook to drive roller interaction of the continuous haulage system according to the present invention.

FIG. 10 shows the drive system 17 and the belt 1 in cross section, with the continuous belt 18 in contact with the hooks 4a and 4b. The orientation of the drive system 17, in relation to the angle to the vertical is identical to that of the idlers 3a and 3b. Hence, the drive system 17 is located within a framework such that the drive system 17 also supports the belt 1 in the same manner as idlers 3a and 3b located within a support frame (not shown). Thus, the incorporation of the drive system 17 along the path of the continuous haulage system is non-intrusive and with the continuous haulage system being flexible enough to not be restricted in the number of drive systems that can be incorporated.

Figure 11:
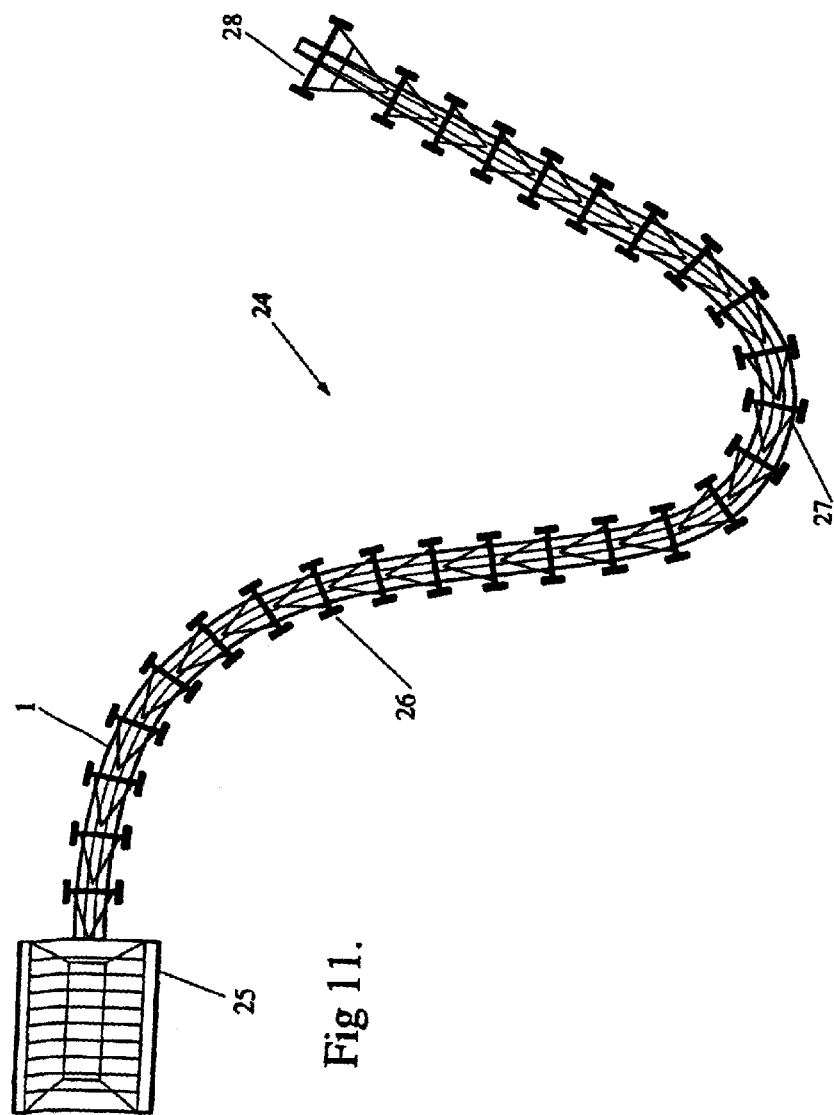
FIG. 11 is a plan view of the continuous haulage system.

FIG. 11 shows a plan view of the entire continuous haulage system 24. The system comprises a hopper 25 that material is loaded into for delivery to the belt 1. Material may be loaded by any number of means, such as from laden trucks, direct from a mine face or from a crushing plant. The material from the hopper 25 travels along the belt 1 which is supported by a series of support frames 26, which use either idler sets 2 or drive systems 14 to contact the hooks 4a and 4b of the belt 1. Each of the support frames 26 have a pivotal system incorporated such that a restricted degree of angular movement in the horizontal and vertical planes, as well as torsionally about a longitudinal axis of the continuous haulage system 1, is permissible. Adjacent frames 26 can be either directly connected or be isolated from each other. In the case of the direct connection, the connection provides for further degrees of angular movement. In either case, the position of the frames 26 can be adjusted such that the path of the continuous haulage system 24 can adopt a selectively curvi-linear shape 27.

This degree of movement permits, therefore, the relative position of the hopper 25 and the unloading point 28 to vary by advancing the hopper 25 in accordance with movement of, say, the point of extraction of the ROM material. As the hopper 25 is advanced, at least one of the frames 26 will accommodate the movement of the continuous haulage path. Thus, the articulation in the, at least one, frame permits the system to self align, permitting straightening. Hence, for situations where the ideal loading position varies continually, the position of the hopper 25 may be conveniently and readily adjusted to match this movement.

Further, for instances where the total movement of the ideal loading point is known at the design stage of the continuous haulage system 24, the required maximum length of the continuous haulage system 24 can be placed, with substantial meanders incorporated in the path, and thus have the relative position of the hopper 25 and the unloading point 28 relatively small at commencement of operations. As the ideal loading point moves away from the unloading point, the meanders within the path may be straightened until the furthest position of the ideal loading point is reached. At this point the continuous haulage system 24 path will be straight.

Figure 12:
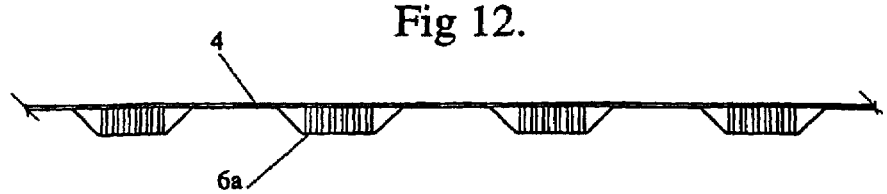
FIG. 12 is a side elevation of the segmented belt of a sixth possible arrangement of the continuous haulage system according to the present invention

FIG. 12 shows a segmented belt 6a arrangement, as an alternative to the continuous belt. At various stages in the life of a mine, the quantity of material being removed will vary. Thus, whilst the continuous haulage system may be designed for a maximum capacity, is may be less advantageous to operate the system at this high capacity when only a portion is actually being removed. This the system must accommodate the lesser capacity. Despite the lower capacity, the actual size of the rocks being removed is unlikely to vary, and so the belt must still be able to encapsulate large rocks. By providing a segmented belt 6a, the volume of the belt is maintained, but the total volume of material being conveyed can be controlled by managing the proportion of actual belt per meter length of the system as a whole. Further, to contain material within the belt units 6a it is possible to use end plugs or containment barriers at the open ends of each unit 6a, and thus prevent material "leaking". It should be noted that, although the belt is segmented, the hook profile 4 is continuous, so as to maintain the drive and support of the system.

What is claimed is:

1. A continuous haulage system, comprising:
   a belt adapted to convey material, said belt including opposing reinforced longitudinal edges each including a hanging member having a hook-shaped profile with a concave portion located continuously along each opposing longitudinal edge of said belt; and
   a plurality of discrete supporting idlers, said belt suspended independently along each edge thereof by said hanging members from said idlers such that said concave portions of said hanging members are positioned directly on said idlers, said concave portions providing rolling surfaces for said idlers as said belt conveys material.

2. A continuous haulage system according to claim 1 wherein the idlers are adapted to selectively cause the longitudinal edges to converge to retain material within the belt and diverge to load or unload material from the belt.

3. A continuous haulage system according to claim 2 wherein the idlers are driven or non-driven idlers.

4. A continuous haulage system according to claim 2 wherein the idlers include a plurality of idler batteries.

5. A continuous haulage system according to claim 4 wherein the idler batteries individually include a first series of idlers and a second series of idlers, the first and second series positioned on opposing sides of the belt and adapted to support the belt by engaging the respective hanging members.

6. A continuous haulage system according to claim 5 wherein the convergence and divergence of the longitudinal edges is achieved by successive idler batteries, having incrementally spaced series of idlers.

7. A continuous haulage system according to claim 3 wherein the hanging members and the idlers make contact through respective dissimilarly curved surfaces.

8. A continuous haulage system according to claim 3 wherein the hanging members are oriented with the concave portions of the hook-shaped profiles being directed downwards.

9. A continuous haulage system according to claim 3 wherein the hanging members each further include a reverse curve to the hook-shaped profile, said reverse curve providing a second concave portion which is directed upwards wherein the idlers further include at least one additional idler which contacts the second concave portion of the hanging member.

10. A continuous haulage system according to claim 3 wherein each hanging member further includes a second hook-shaped profile along each longitudinal edge, the second hook-shaped profile being oriented as a mirror image of the first.

11. A continuous haulage system according to claim 3 wherein the belt includes a plurality of discrete portions.

12. A continuous haulage system according to claim 11 wherein the discrete portions are spaced apart, and connected through the hanging members only.

13. A continuous haulage system according to claim 11 wherein the belt is corrugated, said corrugations propagating longitudinally along the length of the belt.

14. A continuous haulage system according to claim 13 wherein each corrugation acts as an articulation means, for flexing the belt about an axis perpendicular to a longitudinal axis of the belt.

15. A continuous haulage system according to claim 13 wherein the corrugations are inclined at an angle to a vertical axis of the belt.

16. A continuous haulage system according to claim 13 wherein the corrugations partially extend around the periphery of the belt and are placed symmetrically about a center line of the belt.

17. A continuous haulage system according to claim 13 wherein each of the corrugations varies from a maximum depth at a center line of the belt to a minimum depth at extreme ends of each corrugation, such variance being symmetrical about said center line.

18. A continuous haulage system comprising:
   a belt adapted to convey material, said belt including opposing reinforced longitudinal edges each including a hanging member having a hook-shaped profile with a concave portion located continuously along each opposing longitudinal edge of said belt;

a plurality of discrete supporting idlers, said belt being suspended independently along each edge thereof by said hanging members from said idlers such that said concave portions of said hanging members are positioned directly on said idlers, said concave portions providing rolling surfaces for said idlers as said belt conveys material; and at least one belt drive system connected to said belt by engaging a receiving means located along each opposing longitudinal edge of the belt.

19. A continuous haulage system according to claim 18 wherein the belt drive system includes a caterpillar drive having a continuous elongate drive surface.

20. A continuous haulage system according to claim 19 wherein the caterpillar drive includes a series of sprockets adapted to engage a chain, said chain being integral with the continuous elongate drive surface.

21. A continuous haulage system according to claim 19 wherein one or both of the hanging members and the elongate drive surface are profiled so as to enhance the imparted driving force.

22. A continuous haulage system according to claim 19 wherein the belt drive system includes a plurality of said caterpillar drives placed intermediate between extreme ends of the continuous haulage system.

23. A continuous haulage system according to claim 18 wherein at each of the extreme ends of the continuous haulage system there is located an undriven pulley unit adapted to support and return the driven belt.

24. A continuous haulage system according to claim 18 wherein the belt drive system and the idlers are mounted within a single framework.

25. A continuous haulage system according to claim 18 wherein the belt drive system is mounted in a plurality of discrete and separable frames.

26. A continuous haulage system comprising:

a belt adapted to convey material, said belt including opposing reinforced longitudinal edges each including a hanging member having a hook-shaped profile with a concave portion located continuously along each opposing longitudinal edge of said belt;

a plurality of discrete supporting idlers, said belt suspended independently along each edge thereof by said hanging members from said idlers such that said concave portions of said hanging members are positioned directly on said idlers, said concave portions providing rolling surfaces for said idlers as said belt conveys material; and an articulated support system including a plurality of support frames each being pivotal in the horizontal plane and also in the vertical plane.

27. A continuous haulage system according to claim 26 wherein additional individual support frames can be selectively added to the articulated support system.

28. A continuous haulage system according to claim 26, further including at least one drive means adapted to impart a driving force to said belt by engaging said hanging members located along each opposing longitudinal edge of the belt.

29. A continuous haulage system according to claim 28 wherein the driving means and the idlers are separately, or in combination, mounted in the support frames.

30. A belt for a continuous haulage system, comprising opposed reinforced longitudinal edges each including a hanging member having a hook-shaped profile with a concave portion located continuously along each opposing longitudinal edge of said belt, wherein the belt is suspended independently along each edge thereof by said hanging members from a plurality of discrete supporting idlers such that said concave portions of said hanging members are positioned directly on said idlers, said concave portions providing rolling surfaces for said idlers as said belt conveys material.

31. A belt for a continuous haulage system according to claim 30 wherein the hanging members are each oriented with the hook-shaped profile being directed downwards.

32. A belt for a continuous haulage system according to claim 30 wherein the hanging members each include a reverse curve to the hook-shaped profile, said reverse curve providing a concave aspect which is directed upwards.

33. A belt for a continuous haulage system according to claim 30 wherein the hanging members each include a second hook-shaped profile along each longitudinal edge, the second hook-shaped profile being oriented as a mirror image of the first.

34. A belt for a continuous haulage system according to claim 30 wherein the belt is corrugated, said corrugations propagating longitudinally along a length of the belt.

35. A belt for a continuous haulage system according to claim 34 wherein each corrugation acts as an articulation means, for flexing the belt about an axis perpendicular to a longitudinal axis of the belt.

36. A belt for a continuous haulage system according to claim 34 wherein the corrugations are inclined at an angle to a vertical axis of the belt.

37. A belt for a continuous haulage system according to claim 34 wherein the corrugations partially extend around the periphery of the belt and are placed symmetrically about a center line of the belt.

38. A belt for a continuous haulage system according to claim 34 wherein each of the corrugations varies from a maximum depth at a center line of the belt to a minimum depth at extreme ends of each corrugation, such variance being symmetrical about said center line.

* * * * *